United States Patent
Bathina et al.

(10) Patent No.: US 9,322,336 B2
(45) Date of Patent: Apr. 26, 2016

(54) FUEL NOZZLE FOR GAS TURBINE

(71) Applicant: General Electric Company, Schenectady, NY (US)

(72) Inventors: Mahesh Bathina, Karnataka (IN); Madanmohan Manoharan, Karnataka (IN); Stephen Robert Thomas, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 612 days.

(21) Appl. No.: 13/707,543

(22) Filed: Dec. 6, 2012

(65) Prior Publication Data
US 2014/0157787 A1    Jun. 12, 2014

(51) Int. Cl.
| | |
|---|---|
| F02C 7/22 | (2006.01) |
| F23R 3/28 | (2006.01) |
| F02C 9/40 | (2006.01) |
| F23L 7/00 | (2006.01) |
| F23N 1/00 | (2006.01) |
| F23N 5/00 | (2006.01) |
| F23R 3/16 | (2006.01) |
| F23R 3/20 | (2006.01) |
| F23R 3/30 | (2006.01) |
| F23R 3/32 | (2006.01) |
| F23R 3/36 | (2006.01) |

(52) U.S. Cl.
CPC ...... *F02C 7/22* (2013.01); *F02C 9/40* (2013.01); *F23L 7/00* (2013.01); *F23N 1/002* (2013.01); *F23N 5/003* (2013.01); *F23R 3/286* (2013.01); *F23C 2900/07001* (2013.01); *F23K 2401/10* (2013.01); *F23N 2037/08* (2013.01); *F23N 2041/20* (2013.01)

(58) Field of Classification Search
CPC ............ F02C 7/22; F02C 7/222; F02C 7/228; F02C 7/232; F02C 7/2365; F02C 3/30; F23R 3/14; F23R 3/16; F23R 3/18; F23R 3/20; F23R 3/28; F23R 3/30; F23R 3/32; F23R 3/36; F23R 3/286
USPC .................... 60/742, 746, 748, 776
See application file for complete search history.

(56) References Cited

U.S. PATENT DOCUMENTS

| | | | |
|---|---|---|---|
| 7,523,603 B2 * | 4/2009 | Hagen et al. | 60/39.55 |
| 2009/0223228 A1 * | 9/2009 | Romoser | 60/776 |
| 2010/0180599 A1 * | 7/2010 | Thomas et al. | 60/737 |
| 2011/0300491 A1 | 12/2011 | Wasif | |

* cited by examiner

*Primary Examiner* — Ehud Gartenberg
*Assistant Examiner* — Filippo Manfredi
(74) *Attorney, Agent, or Firm* — Fletcher Yoder, P.C.

(57) ABSTRACT

A gas turbine system includes a fuel nozzle. The fuel nozzle includes a first fluid conduit defining a first fuel passage, a second fluid conduit defining a second fuel passage, and a third fluid conduit defining an oxidant passage. A first plurality of orifices is disposed along the first fluid conduit and is configured to fluidly couple the first fuel passage to the oxidant passage. A second plurality of orifices is disposed on the third fluid conduit and is configured to fluidly couple the second fuel passage to the oxidant passage. A first diameter of the first plurality of orifices is less than a second diameter of the second plurality of orifices.

13 Claims, 5 Drawing Sheets

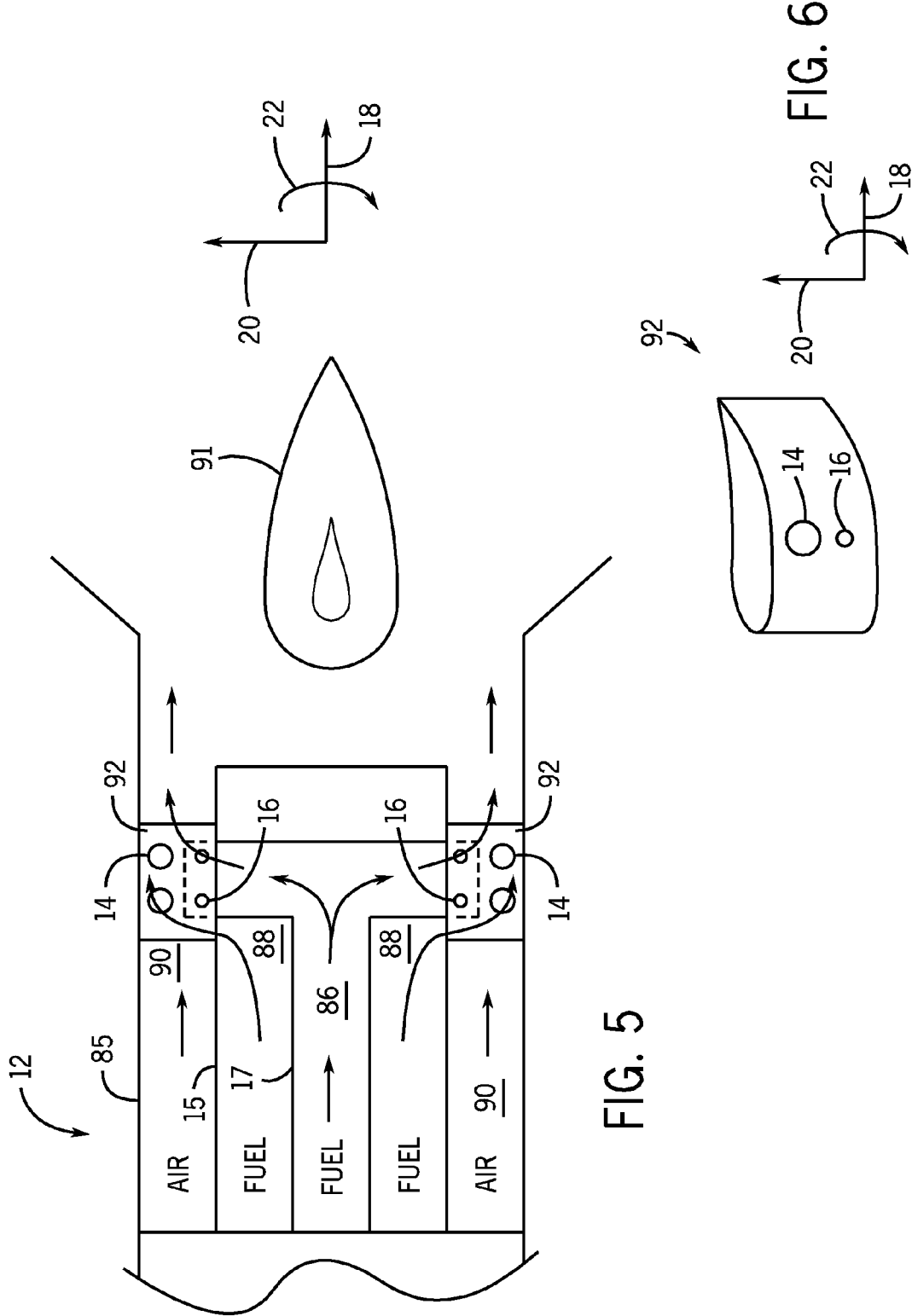

FUEL NOZZLE FOR GAS TURBINE

BACKGROUND OF THE INVENTION

The subject matter disclosed herein relates to gas turbines, and more specifically, to systems and methods for controlling fuel flow in fuel nozzles.

Gas turbine systems generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a gas turbine system includes a fuel nozzle. The fuel nozzle includes a first fluid conduit defining passage first fuel passage, a second fluid conduit defining a second fuel passage, and a third fluid conduit defining an oxidant passage. A first plurality of orifices is disposed along the first fluid conduit and is configured to fluidly couple the first fuel passage to the oxidant passage. A second plurality of orifices is disposed on the third fluid conduit and is configured to fluidly couple the second fuel passage to the oxidant passage. A first diameter of the first plurality of orifices is less than a second diameter of the second plurality of orifices.

In a second embodiment, a gas turbine system includes a compressor configured to pressurize an oxidant, a fuel supply system configured to supply fuel, at least one fuel nozzle configured to mix the oxidant and the fuel, a combustor configured to receive a mixture of the oxidant and the fuel from the at least one fuel nozzle and to combust the mixture into combustion products, and a turbine configured to extract work from the combustion products. The at least one fuel nozzle includes a first fluid conduit defining a first fuel passage, a second fluid conduit defining a second fuel passage, and a third fluid conduit defining an oxidant passage. A first plurality of orifices is disposed along the second fluid conduit and is configured to fluidly couple the first fuel passage to the oxidant passage. A second plurality of orifices is disposed on the third fluid conduit and is configured to fluidly couple the second fuel passage to the oxidant passage. A first diameter of the first plurality of orifices is less than a second diameter of the second plurality of orifices In a third embodiment, a method includes directing a first fuel through a first orifice of a first fluid conduit of a fuel nozzle, directing a second fuel through a second orifice of a second fluid conduit of the fuel nozzle, and directing an oxidant through a third fluid conduit of the fuel nozzle. A first diameter of the first orifice is less than a second diameter of the second orifice.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a schematic diagram of an embodiment of the fuel nozzle of FIG. 1, illustrating a swirler having the premixing orifices of varying size;

FIG. 6 is a perspective view of an embodiment of a swirl vane of the swirler of FIG. 5.

DETAILED DESCRIPTION OF THE INVENTION

Figure 1:
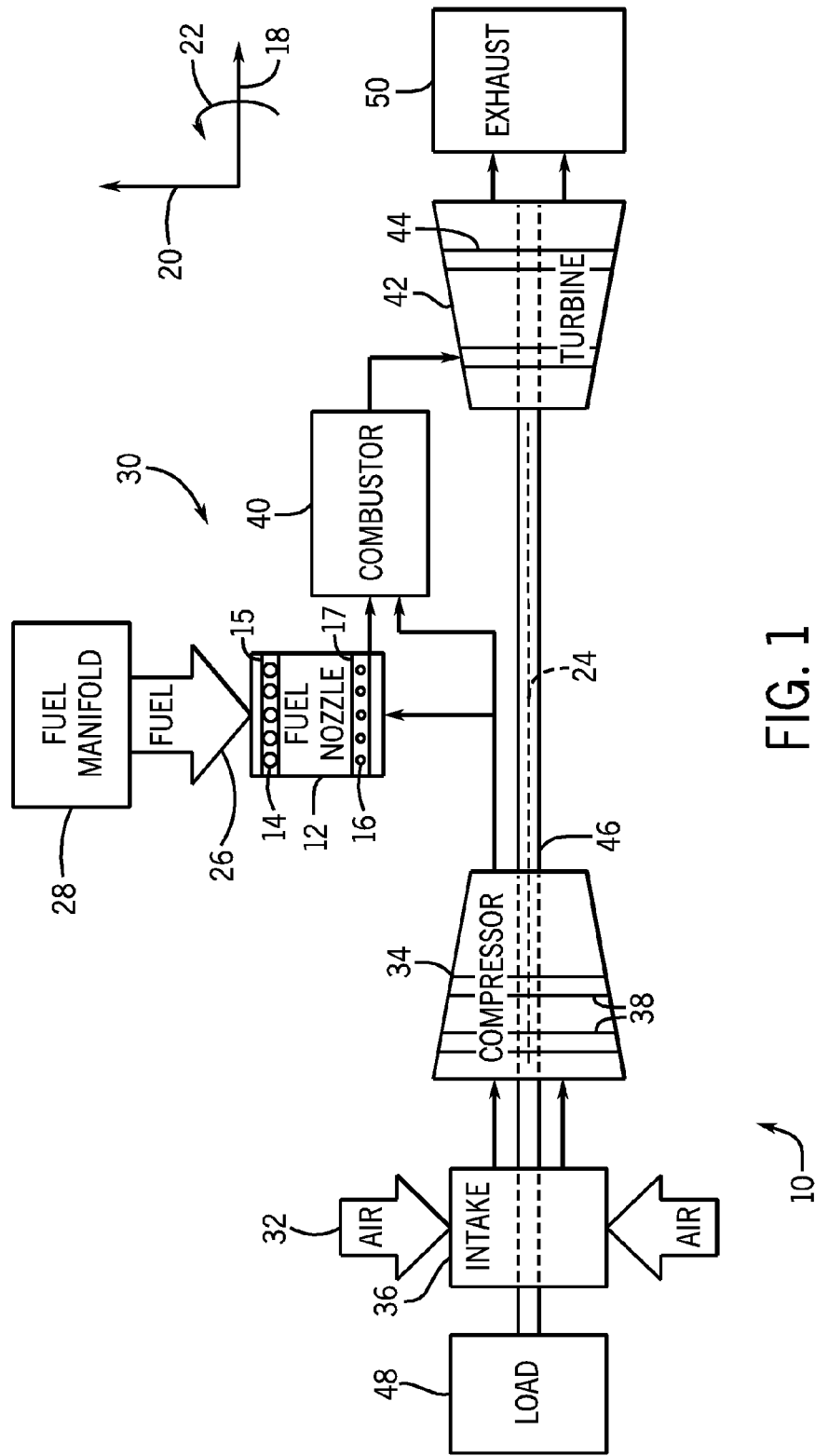
FIG. 1 is a schematic diagram of an embodiment of a gas turbine system having a fuel nozzle with premixing orifices of varying size to improve flame stability.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed toward systems and methods to improve flame stability within combustors of gas turbine systems (e.g., operating predominantly in premix mode of combustion). In certain embodiments, each combustor includes one or more fuel nozzles with a plurality of orifices, which stabilize or regulate a flow of fuel into the combustor. In particular, the orifices may include a first orifice with a first size, a second orifice with a second size, and a third orifice with a third size, wherein the first, second, and third sizes are different from one another. These different sizes may be used to enable flow stabilization or regulation at different flow rates, which may correspond to different operational modes of the gas turbine system. For example, the first orifice may be sized to stabilize fuel flow during a transient or startup mode, the second orifice may be sized to stabilize fuel flow during a steady-state mode, and the third orifice may be sized to stabilize fuel flow during a transition between the startup and steady-state modes. Thus, the second orifice may be sized based on a rated capacity (e.g., full load or steady-state operation) of the gas turbine system. Unfortunately, at partial load conditions (e.g., transient operation associated with a lower flow rate of fuel), the size of the orifice may be unsuitable for pressure and flow stabilization of the lower flow rate. Thus, it is now recognized that providing multiple orifice sizes within the fuel nozzle may improve the stability of the gas turbine system at both partial load and full load conditions. In particular, a fuel may be directed through a smaller first orifice when the fuel flow rate is relatively low (e.g., during startup or partial load conditions), thereby enabling pressure and flow stabilization of the lower flow rate of fuel. When the fuel flow rate is at or near a rated flow, the fuel may be directed through a larger second orifice to stabilize the pressure and flow of the higher flow rate of the fuel. Furthermore, the third orifice (sized between the first and second orifices) may be used to provide a more gradual transition between the first mode (e.g., partial load or start-up mode) and the second mode (e.g., full load or steady-state).

Turning now to the figures, FIG. 1 illustrates a block diagram of an embodiment of a gas turbine system 10 having a fuel nozzle 12 with premixing orifices 14 and 16 of varying size within respective fuel conduits 15 and 17 to improve the operability of the gas turbine system 10. For example, the orifices 14 (e.g., larger orifices) may have a larger diameter, cross-sectional area, and/or perimeter than the orifices 16 (e.g., smaller orifices). In certain embodiments, a ratio of the diameter, cross-sectional area, or perimeter of the larger orifices 14 to the smaller orifices 16 may be approximately 1.1 to 15, 1.2 to 10, 2 to 5, and all suitable subranges therebetween. As shown, the orifices 14 and 16 are generally circular, but in certain embodiments may have a polygonal, elliptical, or otherwise arcuate shape. Further, the larger orifices 14 may be sized according to a rated capacity of the gas turbine system 10, whereas the smaller orifices 16 may be sized based on partial load conditions. As mentioned above, it may be desirable to direct fuel through the larger orifices 14, the smaller orifices 16, or both, based on the operating conditions of the gas turbine system 10 in order to improve the efficiency and operability of the gas turbine system 10.

Throughout the discussion, a set of axes will be referenced. These axes are based on a cylindrical coordinate system and point in an axial direction 18, a radial direction 20, and a circumferential direction 22. For example, the axial direction 18 extends along a longitudinal axis 24 of the gas turbine system 10, the radial direction 20 extends away from the longitudinal axis 24, and the circumferential direction 22 extends around the longitudinal axis 24.

The fuel nozzle 12 receives a fuel 26 from a fuel manifold 28 of a fuel supply system 30. The fuel 26 is routed through the larger orifices 14 (i.e., fuel conduit 15), the smaller orifices 16 (i.e., fuel conduit 17), or both, depending on the operating mode or other varying conditions of the gas turbine system 10. For example, during start-up or partial load conditions, a flow rate of the fuel 26 may be relatively low (e.g., approximately 5 to 70, 10 to 60, or 20 to 40 percent of the rated flow), and it may be desirable to route the fuel through the smaller orifices 16 for improved pressure and flow stability. However, when the flow rate of the fuel 26 is at or near the rated flow (e.g., approximately 50 to 120, 60 to 100, or 80 to 90 percent of the rated flow), it may be desirable to route the fuel through the larger orifices 14.

Depending on the operating conditions of the gas turbine system 10, it may be desirable to route the fuel 26 through both orifices 14 and 16 simultaneously. For example, during start-up of the gas turbine system 10, approximately 20 to 100, 30 to 90, or 40 to 80 percent of the fuel 26 may be directed through the smaller orifices 16, with the remainder (if any) of the fuel 26 directed through the larger orifices 14. As the gas turbine system 10 continues the start-up process, the percentage of fuel directed to the larger orifices 14 may increase. Once the gas turbine system 10 reaches steady-state, approximately 20 to 100, 30 to 90, or 40 to 80 percent of the fuel 26 may be directed through the larger orifices 14, with the remainder (if any) of the fuel 26 directed through the smaller orifices 16.

As will be explained below, the fuel 26 may be a mixture of several components, such as primary fuels (e.g., methane), fuel additives or secondary fuels (e.g., higher hydrocarbons (HHCs) having more carbon atoms than the primary fuel), and/or diluents (e.g., non-combustibles such as steam or nitrogen). The composition of the fuel 26 may vary based on the operating mode of the gas turbine system 10 (e.g., start-up, steady-state, transient, partial load, full load). In addition, a different composition of the fuel 26 may be directed to the larger orifices 14 as compared to the smaller orifices 16. More specifically, the fuel 26 flowing through the larger orifices 14 may have a different heating value, density, average molecular weight, or degree of saturation as compared to the fuel 26 flowing through the smaller orifices 16. Furthermore, the composition of the fuel 26 flowing through the orifices 14 and 16 may be controlled in order to improve the flame stability within the gas turbine system 10.

As shown in FIG. 1, the fuel nozzle 12 also receives an oxidant, such as air 32, from a compressor 34. That is, the air 32 flows from an air intake 36 into the compressor 34, where the rotation of compressor blades 38 pressurizes the air 32. Within the fuel nozzle 12, the fuel 26 mixes with the air 32 through the premixing orifices 14 and 16. Thereafter, the mixture of the fuel 26 and the air 32 is directed to a combustor 40 at a ratio suitable for combustion, emissions, fuel consumption, power output, and the like. The mixture is combusted into hot combustion products within the combustor 40. These hot combustion products enter a turbine 42 and force turbine blades 44 to rotate, thereby driving a shaft 46 into rotation. The rotating shaft 46 provides the energy for the compressor 34 to compress the air 32. More specifically, the rotating shaft 46 rotates the compressor blades 38 attached to the shaft 46 within the compressor 34, thereby pressurizing the air 32 that enters the compressor 34 through the air intake 36. In addition, the rotating shaft 46 may rotate or drive a load 48, such as an electrical generator or any device capable of utilizing the mechanical energy of the shaft 46. After the turbine 42 extracts useful work from the combustion products, the combustion products are discharged to an exhaust 50.

Figure 2:
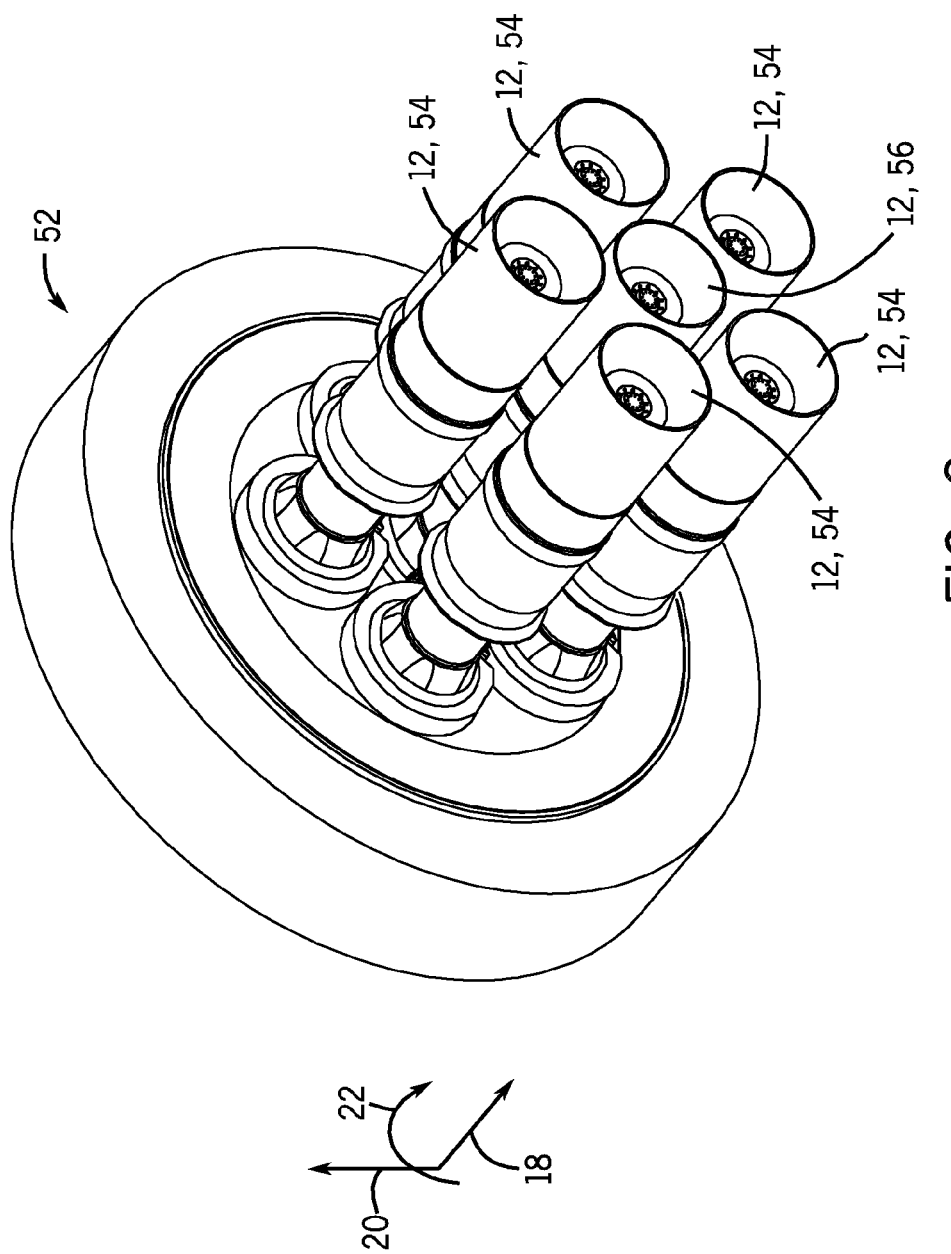
FIG. 2 is a perspective view of an embodiment of the fuel nozzles of FIG. 1, illustrating an arrangement of the fuel nozzles within a combustor of the gas turbine system.

FIG. 2 illustrates an embodiment of the gas turbine system 10 having multiple fuel nozzles 12. As shown, six fuel nozzles 12 are mounted to a head end 52 of the combustor 40. The fuel nozzles 12 are disposed in a concentric arrangement. That is, five fuel nozzles 12 (e.g., outer fuel nozzles 54) are disposed about a central fuel nozzle 56. As will be appreciated, the arrangement of the fuel nozzles 12 about the head end 52 may vary. For example, the fuel nozzles 12 may be disposed in a circular arrangement, a linear arrangement, or in any other suitable arrangement. In addition, the number of fuel nozzles 12 may vary. For example, certain embodiments of the gas turbine system 10 may include 1, 2, 3, 4, 5, 10, 50, 100, or more fuel nozzles 12.

As explained above, the fuel nozzles 12 may include the premixing orifices 14 and 16 of varying size to provide greater flow and pressure stabilization of the fuel 26 during the various operating modes of the gas turbine system 10. In certain embodiments, a subset of the fuel nozzles 12 may include the varied sizes of premixing orifices (e.g., 14 and 16), whereas another subset of the fuel nozzles 12 includes a single size of premixing orifices. For example, the central fuel nozzle 56 (e.g., pilot fuel nozzle) may have a greater influence on flame stability, and it may be desirable to equip the central fuel nozzle 56 with the premixing orifices 14 and 16 of varying size. Each of outer fuel nozzles 54 may be equipped with premixing orifices of a single size (e.g., corresponding to the premixing orifices 14 or 16). In other words, the fuel nozzles 12 may be equipped with the larger premixing orifice 14, the smaller premixing orifice 16, or both. In addition, the size of the respective premixing orifices 14 and 16 may vary between each of the fuel nozzles 12.

Figure 3:
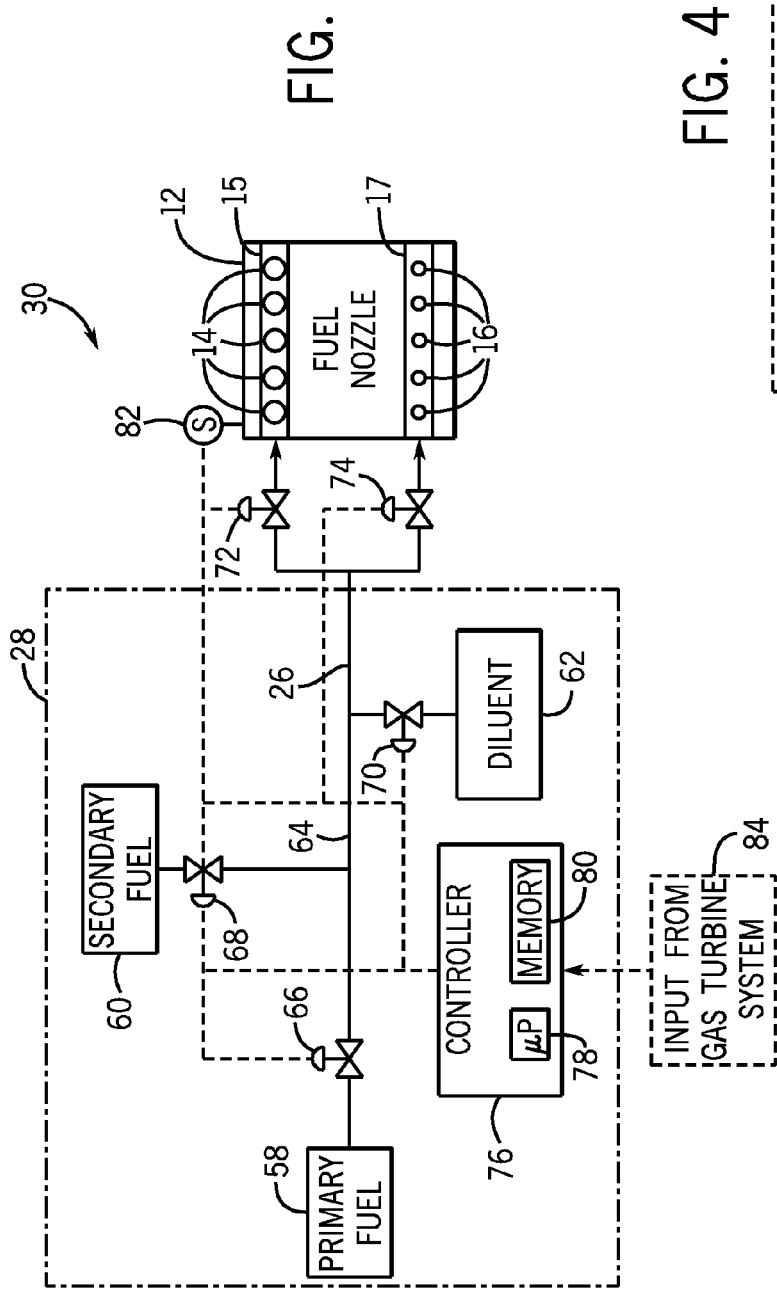
FIG. 3 is a block diagram of an embodiment of a fuel supply system to provide a fuel to the premixing orifices of the fuel nozzle of FIG. 1.

FIG. 3 is a block diagram of an embodiment of the fuel supply system 30 that supplies the fuel 26 to the premixing orifices 14 and 16 of the fuel nozzle 12. As shown, the fuel supply system 30 includes a fuel manifold 28 having a primary fuel supply 58, a secondary fuel supply 60, and a diluent supply 62 coupled together by a common pipeline 64. In certain embodiments, the supplies 58, 60, and 62 may be delivered separately to the fuel nozzle 12, and thus the fuel supply system may include multiple pipelines rather than the common pipeline 64. It should be noted that certain embodiments of the fuel manifold 28 may include any combination of the supplies 58, 60, and 62. In addition, each of the supplies 58, 60, and 62 may be provided by storage tanks, mobile skids, upstream or downstream systems relative to the gas turbine system 10, or any other suitable source.

As noted above, it may be desirable to adjust the composition of the fuel 26 to the premixing orifices 14 and 16 (i.e., to the fuel conduits 15 and 17) based on the operating mode of the fuel nozzle 12. Accordingly, control valves 66, 68, and 70 are disposed between the respective supplies 58, 60, and 62 and the common pipeline 64. Each of the control valves 66, 68, and 70 may be adjusted to selectively enable, throttle, or block flow of the primary fuel 58, the secondary fuel 60, and/or the diluent 62 in order to adjust the composition of the fuel 26. For example, during steady-state, partial-load, and/or transient operation of the gas turbine system 10, it may be desirable to direct the diluent 62 to the fuel nozzle 12 to improve the flame stability within the combustor 40. In such a circumstance, the control valve 70 may be opened to increase the flow of the diluent 62 to the fuel nozzle 12.

Additionally or alternatively, it may be desirable to selectively direct the fuel 26 through the larger orifices 14 (e.g., the fuel conduit 15), the smaller orifices 16 (e.g., the fuel conduit 17), or both, based on the operating mode of the gas turbine system 10. To this end, the fuel supply system 30 includes control valves 72 and 74 that selectively enable, throttle, or block the flow of the fuel 26 to the premixing orifices 14 and 16. For example, during a full load or steady-state mode, the control valve 72 may be opened to increase the flow rate of the fuel 26 to the larger premixing orifices 14, thereby improving the operability of the gas turbine system 10. Additionally or alternatively, during a partial-load or transient operation, the control valve 74 may be opened to increase the flow rate of the fuel 26 to the smaller premixing orifices 16.

In order to control the operation of fuel supply system 30, a controller 76 is communicatively coupled to the control valves 66, 68, 70, 72, and 74. The controller 76 includes a processor 78 and memory 80 to execute instructions to control the composition and flow path of the fuel 26 (i.e., through the larger orifices 14 of the fuel conduit 15, the smaller orifices 16 of the fuel conduit 17, or both) by adjusting the respective control valves 66, 68, 70, 72, and 74. The instructions may be encoded in software programs that may be executed by the processor 78. Further, these instructions may be stored in a tangible, non-transitory, computer-readable medium, such as the memory 80. The memory 80 may include, for example, random-access memory, read-only memory, hard drives, and/or the like. In certain embodiments, the controller 76 may execute instructions to control the composition and flow path of the fuel 26 based on an operating condition of the gas turbine system 10.

As shown, the controller 76 receives input from a sensor 82 as well as other input 84 from the gas turbine system 10. This input may be indicative of a load condition (e.g., low, medium, or high), a steady state or transient mode (e.g., startup), a fuel flow state (e.g., low, medium, or high), or any combination thereof. The sensor 82 is coupled to the fuel nozzle 12 and detects operating conditions related to combustion of the fuel 26 and the air 32. For example, the sensor 82 may detect a pressure drop across the orifices 14 or 16, a flow rate of the fuel 26, a flame temperature, a flame length, a flame volume, a combustion gas composition (e.g., level of exhaust emissions, such as $CO_2$, CO, $NO_x$, etc.) or any other suitable combustion parameter. The input 84 may include other parameters related to the gas turbine system 10, such as a rotational speed of the shaft 46 or a work output of the turbine 42. The controller 76 may execute instructions to control the control valves 66, 68, 70, 72, and 74 based on the inputs from the sensor 82 and from the gas turbine system 10. For example, when the flow rate of the fuel 26 is relatively low (e.g., less than 20, 30, or 40 percent of the rated flow), the controller 76 may open the control valve 74 to enable the fuel 26 to flow through the smaller orifices 16, thereby improving the pressure and flow stability of the fuel 26. On the other hand, when the flow rate of the fuel 26 is sufficiently high (e.g., greater than 20, 40, or 60 percent of the rated flow), the controller may open the control valve 72 to enable the fuel 26 to flow through the larger orifices 14.

Figure 4:
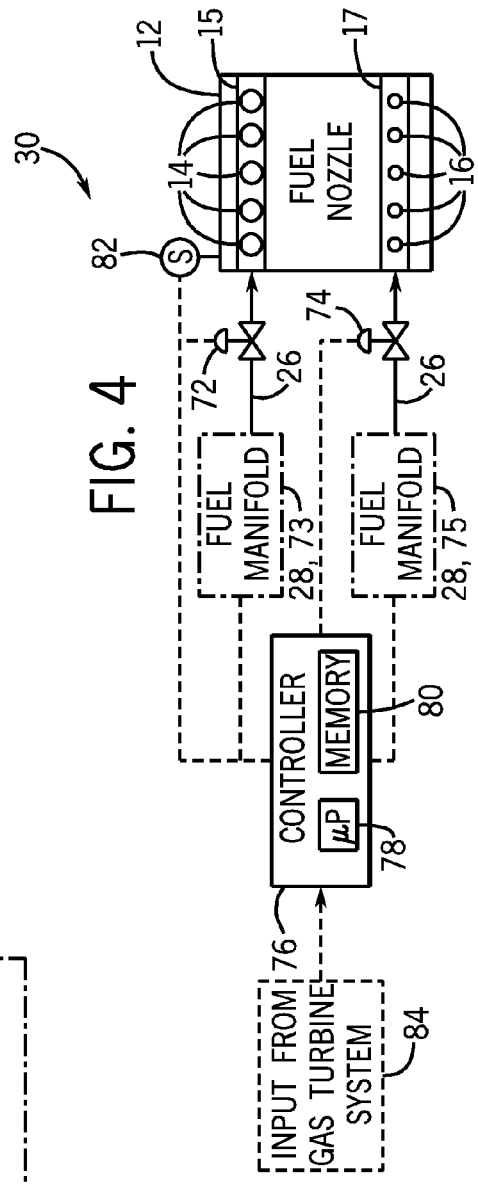
FIG. 4 is a block diagram of another embodiment of a fuel supply system to provide multiple fuels to the premixing orifices of the fuel nozzle of FIG. 1.

Although the embodiment shown in FIG. 3 includes a single fuel manifold 28 to provide the fuel 26 to the fuel conduits 15 and 17, certain embodiments may include one or more fuel manifolds 28. For example, as shown in FIG. 4, the fuel supply system 30 may include two fuel manifolds 28 that independently supply the fuel 26 to the fuel conduits 15 and 17 (and subsequently to the premixing orifices 14 and 16). In other words, changing the fuel composition delivered by a first fuel manifold 28, 73 does not affect the fuel composition of a second fuel manifold 28, 75. Accordingly, each of the fuel manifolds 28 may deliver a similar or different fuel composition to the respective fuel conduits 15 and 17. As noted earlier, it may be desirable to vary the fuel composition between the fuel conduits 15 and 17 to improve the operability and efficiency of the gas turbine system 10. For example, during start-up or transient operation, the fuel manifold 75 may deliver a low molecular weight fuel (e.g., methane) to the smaller orifices 16, and the fuel manifold 73 may deliver an intermediate molecular weight fuel (e.g., ethane) to the larger orifices 14. When the fuel nozzle 12 is operating in a steady-state or full-load mode, the fuel manifold 75 may deliver the intermediate molecular weight fuel (e.g., ethane) to the smaller orifices 16, and the fuel manifold 73 may deliver a high molecular weight fuel (e.g., propane or higher hydrocarbons) to the larger orifices 14. It should be noted that in transitioning between transient and steady-state operation, the fuel manifold 75 may deliver a mixture of low and intermediate molecular weight fuel (e.g., a 50/50 mixture) to the smaller orifices 16. In a similar manner, the fuel manifold 73 may deliver a mixture of intermediate and high molecular weight fuels to the larger orifices 14 during a transitional mode. That is, the fuel 26 delivered to the orifices 14 and 16 my vary in composition, flow rate, pressure, temperature, and/or the like based on an operating mode of the fuel nozzle 12 or the gas turbine system 10.

Figure 7:
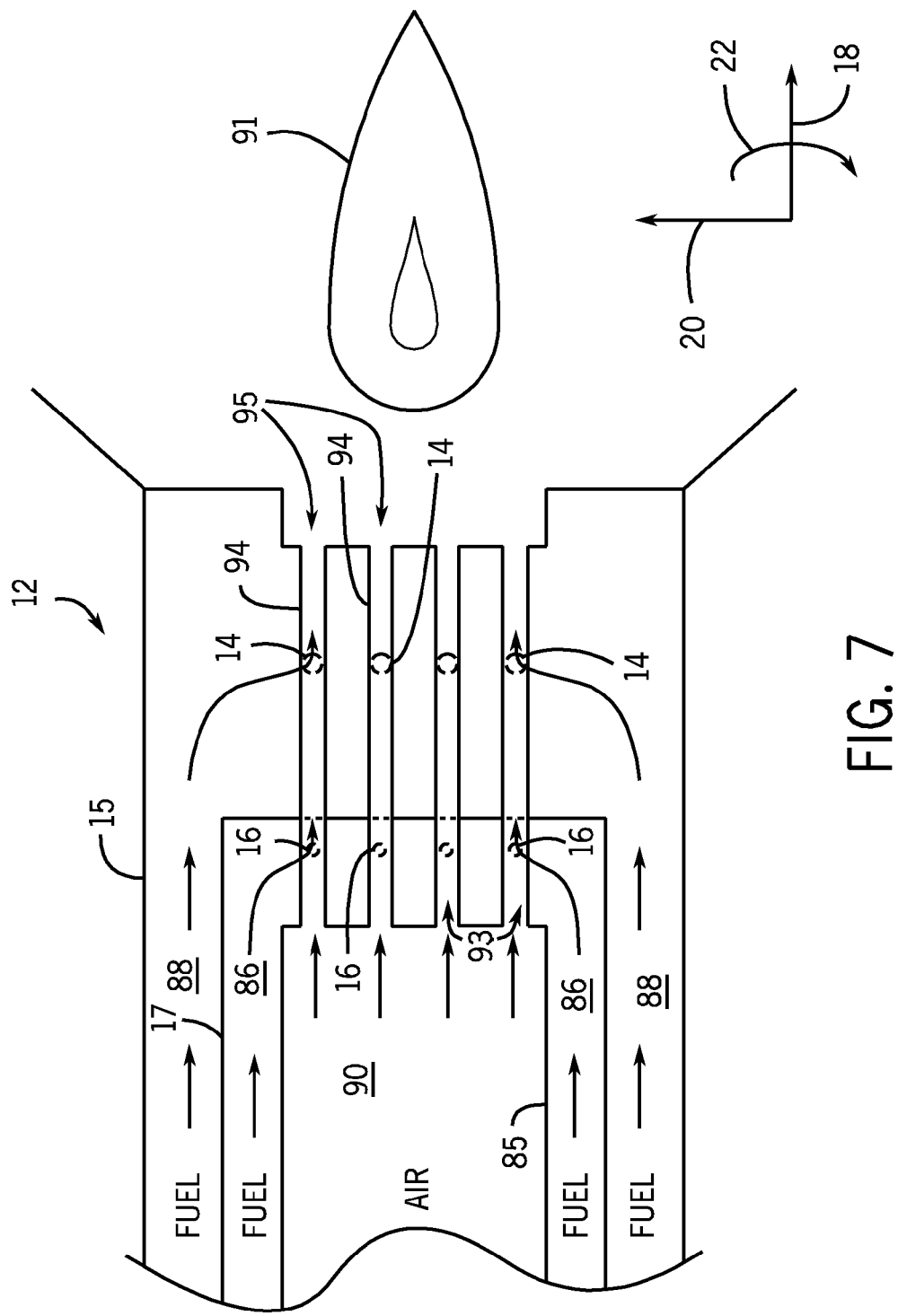
FIG. 7 is a schematic diagram of an embodiment of the fuel nozzle of FIG. 1, illustrating a plurality of premixing tubes having the premixing orifices of varying size.

FIGS. 5-7 illustrate various embodiments of the fuel nozzle 12 including the premixing orifices 14 and 16 of varying size. Again, the orifices 14 may be used during one operational mode, while the orifices 16 are used during another operational mode. As shown in FIG. 5, the fuel nozzle 12 includes the fuel conduits 15 and 17 and a shroud or air or oxidant conduit 85. The conduits 15, 17, and 85 define respective fuel and air passages 86, 88, and 90. As illustrated, the fuel conduit 15 surrounds the fuel conduit 17. For example, the conduits 15 and 17 may be concentric annular conduits. However, in certain embodiments, the relative positions of the fuel conduits 15 and 17 may vary. For example, the fuel conduits 15 and 17 may be adjacent, coaxial, parallel, or occupy any other suitable arrangement.

The fuel nozzle 12 also includes a plurality of swirl vanes 92 to mix the fuel 26 with the air 32. For example, the fuel 26 may flow through the conduit 17, through the premixing orifice 16 of the swirl vane 92, and into the air conduit 85. In a similar manner, the fuel 26 may also flow through the conduit 15, through the premixing orifice 14 of the swirl vane 92, and into the air conduit 85. In other words, the premixing orifices 14 and 16 fluidly couple the respective fuel conduits 15 and 17 to the air conduit 85. The fuel 26 and the air 32 mix and combust to produce a combustion flame 91.

As illustrated more clearly in FIG. 6, the swirl vane 92 is arcuate along the axial 18 direction, which induces a circumferential 22 swirl to the air 32 flowing across the swirl vane 92. The swirl improves the uniformity of the fuel 26 and the air 32 directed to the combustor 40. The swirl vane 92 may have an airfoil shape or teardrop shape, as shown. In addition, the width of the vane may generally decrease in the downstream or axial 18 direction (e.g., converges towards a trailing edge of the swirl vane 92).

The position of the premixing orifices 14 and 16 on the swirl vane 92 may vary based on the relative positions of the fuel conduits 15 and 17. For example, the orifices 14 and 16 may be offset from one another (e.g., axially 18 and/or radially 20 centered on the swirl vane 92), coaxial, or occupy any other suitable positions on the swirl vane 92. Indeed, although the smaller orifice 16 is illustrated with a greater radial 20 offset from the fuel conduit 15, the positions of the orifices 14 and 16 may be interchangeable in certain embodiments.

FIG. 7 illustrates an embodiment of the fuel nozzle 12 having a plurality of premixing tubes 94 to mix the fuel 26 with the oxidant, e.g., air 32. The air 32 flows through the conduit 85 into the premixing tubes 94, e.g., via axial openings 95. For example, the fuel 26 may flow through the fuel conduit 17 and through the premixing orifices 16 of the premixing tubes 94. Similarly, the fuel 26 may flow through the fuel conduit 15 and through the premixing orifices 14 of the premixing tubes 94. In the illustrated embodiment, the orifices 14 and 16 are disposed along a side wall of the tubes 94 axially between the axial end openings 93 (e.g., inlets) and axial end openings 95 (e.g., outlets). The fuel 26 and the air 32 mix within each tube 94, and a fuel/air mixture exits each tube 94 through the axial end opening 95. As explained earlier, it may be desirable to control the composition and flow rate of the fuel 26 through each fuel conduit 15 and 17 using the controller 76 and the control valves 66, 68, 70, 72, and 74 in order to improve the efficiency and operability of the gas turbine system 10.

It should be noted that the embodiments of the fuel nozzles 12 and their respective geometries are not intended to be limiting. For example, in another embodiment, the fuel 26 may flow through the air conduit 85 and the respective passage 90, and the air 32 may flow through the conduits 15 and 17 and the respective passages 86 and 88. Indeed, the disclosed techniques may be applied to a variety of fuel nozzle designs, all of which fall within the scope and spirit of the present disclosure.

Technical effects of the disclosed embodiments include systems and methods to improve flame stability within the combustor 40 of the gas turbine system 10. In particular, the fuel nozzle 12 is equipped with the premixing orifices 14 and 16 with varying size. When the fuel flow rate is relatively low, such as during start-up or partial load operation, the fuel 26 may be directed through the smaller orifices 16 to enable greater pressure and flow stabilization of the lower fuel flow rate. However, when the fuel flow rate is at or near the rated flow, the fuel 26 may be directed through the larger orifices 14 to enable pressure and flow stabilization for the greater fuel flow rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas turbine system, comprising:
    a fuel nozzle, comprising:
        a first fluid conduit defining a first fuel passage;
        a second fluid conduit defining a second fuel passage;
        a third fluid conduit defining an oxidant passage;
        a first plurality of orifices disposed along the first fluid conduit and configured to fluidly couple the first fuel passage to the oxidant passage;
        a second plurality of orifices disposed along the second fluid conduit and configured to fluidly couple the second fuel passage to the oxidant passage, wherein a first diameter of each of the first plurality of orifices is less than a second diameter of each of the second plurality of orifices; and
        a plurality of premixing tubes disposed substantially parallel and laterally offset relative to one another, and each tube of the plurality of premixing tubes comprises at least one of the first plurality of orifices and at least one of the second plurality of orifices; and
    a controller configured to control fuel flow through the first and second plurality of orifices based on an operating condition of the gas turbine system, wherein the controller is configured to supply a first fuel flow through the first plurality of orifices during a part load mode or a transient mode, and the controller is configured to supply a second fuel flow through the second plurality of orifices during a full load mode or a steady state mode.

2. The gas turbine system of claim 1, comprising a fuel supply system coupled to the fuel nozzle and the controller, wherein the operating condition is indicative of the part load mode, the transient mode, the full load mode, or the steady state mode, or any combination thereof.

3. The gas turbine system of claim 2, wherein the operating condition comprises a pressure drop across the fuel nozzle, a combustion temperature, a combustion pressure, a combustion flame length, a turbine speed, or any combination thereof.

4. The gas turbine system of claim 1, wherein the controller is configured to supply the first fuel flow through the first plurality of orifices during the part load mode or the transient mode without supplying fuel through the second plurality of orifices, and the controller is configured to supply the second fuel flow through the second plurality of orifices during the full load mode or the steady state mode without supplying fuel through the first plurality of orifices.

5. The gas turbine system of claim 1, wherein the first fluid conduit is fluidly coupled to only the first plurality of orifices each having the first diameter sized less than the second diameter, and the second fluid conduit is fluidly coupled to only the second plurality of orifices each having the second diameter.

6. A gas turbine system, comprising:
a compressor configured to pressurize an oxidant;
a fuel supply system configured to supply a fuel;
at least one fuel nozzle configured to mix the oxidant and the fuel;
a combustor configured to receive a mixture of the oxidant and the fuel from the at least one fuel nozzle and combust the mixture into combustion products;
a turbine configured to extract work from the combustion products; and
a controller configured to control fuel flow;
wherein the at least one fuel nozzle comprises:
a first fluid conduit defining a first fuel passage fluidly coupled to only a first plurality of orifices;
a second fluid conduit defining a second fuel passage fluidly coupled to only a second plurality of orifices; and
a third fluid conduit defining an oxidant passage, wherein the first and second plurality of orifices are configured to fluidly couple the first and second fuel passages to the oxidant passage, wherein the first and second plurality of orifices are disposed on a plurality of premixing tubes disposed substantially parallel and laterally offset relative to one another, and each tube of the plurality of premixing tubes comprises at least one of the first plurality of orifices and at least one of the second plurality of orifices;
wherein a first diameter of each of the first plurality of orifices is less than a second diameter of each of the second plurality of orifices;
wherein the controller is configured to control the fuel flow through the first and second plurality of orifices based on an operating condition of the gas turbine system, the controller is configured to supply a first fuel flow through the first plurality of orifices during a part load mode or a transient mode, and the controller is configured to supply a second fuel flow through the second plurality of orifices during a full load mode or a steady state mode.

7. The gas turbine system of claim 6, wherein the operating condition is indicative of the part load mode, the transient mode, the full load mode, the steady state mode, or any combination thereof, and the operating condition comprises a pressure drop across the at least one fuel nozzle, a combustion temperature, a combustion pressure, a combustion flame length, a turbine speed, or any combination thereof.

8. The gas turbine system of claim 6, wherein the controller is configured to supply the first fuel flow through the first plurality of orifices during the part load mode or the transient mode without supplying fuel through the second plurality of orifices, and the controller is configured to supply the second fuel flow through the second plurality of orifices during the full load mode or the steady state mode without supplying fuel through the first plurality of orifices.

9. A method, comprising:
controlling fuel flow through a fuel nozzle based on an operating condition of a gas turbine system;
supplying a first fuel flow through a first plurality of orifices of a first fluid conduit of the fuel nozzle during a part load mode or a transient mode;
supplying a second fuel flow through a second plurality of orifices of a second fluid conduit of the fuel nozzle during a full load mode or a steady state mode, wherein a first diameter of each of the first plurality of orifices is less than a second diameter of each of the second plurality of orifices, the fuel nozzle comprises a plurality of premixing tubes disposed substantially parallel and laterally offset relative to one another, and each tube of the plurality of premixing tubes comprises at least one of the first plurality of orifices and at least one of the second plurality of orifices; and
supplying an oxidant through a third fluid conduit of the fuel nozzle.

10. The method of claim 9, wherein supplying the first fuel flow comprises supplying the first fuel flow through the first plurality of orifices during the part load mode or the transient mode without supplying fuel through the second plurality of orifices, wherein supplying the second fuel flow comprises supplying the second fuel flow through the second plurality of orifices during the full load mode or the steady state mode without supplying fuel through the first plurality of orifices.

11. The method of claim 9, comprising:
detecting the operating condition related to combustion of the oxidant and the first or second fuel flows using a sensor; and
adjusting respective flow rates of the first and second fuel flows based on the operating condition.

12. The method of claim 11, wherein the operating condition comprises a pressure drop across the first plurality of orifices, the second plurality of orifices, or both.

13. The method of claim 11, wherein adjusting the respective flow rates of the first and second fuel flows is based on a position of the fuel nozzle in a head end of a turbine combustor.

* * * * *